US012622361B2

(12) United States Patent
Smith

(10) Patent No.: US 12,622,361 B2
(45) Date of Patent: May 12, 2026

(54) REGENERATIVE TAILGATE CIRCUIT

(71) Applicant: CNH Industrial America LLC, New Holland, PA (US)

(72) Inventor: Kevin Smith, Narvon, PA (US)

(73) Assignee: CNH Industrial America LLC, New Holland, PA (US)

( * ) Notice: Subject to any disclaimer, the term of this patent is extended or adjusted under 35 U.S.C. 154(b) by 22 days.

(21) Appl. No.: 18/804,434

(22) Filed: Aug. 14, 2024

(65) Prior Publication Data

US 2025/0057085 A1 Feb. 20, 2025

Related U.S. Application Data

(60) Provisional application No. 63/532,719, filed on Aug. 15, 2023.

(51) Int. Cl.
A01F 15/08 (2006.01)
A01F 15/07 (2006.01)

(52) U.S. Cl.
CPC ........ A01F 15/085 (2013.01); A01F 15/0883 (2013.01); A01F 15/07 (2013.01)

(58) Field of Classification Search
CPC ..... A01F 15/085; A01F 15/0883; A01F 15/07
See application file for complete search history.

(56) References Cited

U.S. PATENT DOCUMENTS 4,483,247 A * 11/1984 Coeffic ................ A01F 15/0883
100/88
5,263,410 A * 11/1993 Olin .................... A01F 15/0883
100/88

5,622,104 A 4/1997 Viesselmann et al.
6,272,825 B1 * 8/2001 Anderson ............. A01F 15/085
100/88
7,849,791 B2 * 12/2010 Smith ..................... A01F 15/07
100/88
8,746,137 B1 * 6/2014 Henry ................. A01F 15/0883
100/88
9,930,834 B2 * 4/2018 Chaney .................. A01F 15/08
10,378,260 B2 8/2019 Smith
11,129,334 B2 * 9/2021 Gresset ............... A01F 15/0883
11,696,532 B2 * 7/2023 Casadei ............. F15B 13/0401
56/341
2016/0316633 A1 * 11/2016 Smith ................. A01F 15/0875
2019/0053434 A1 * 2/2019 Reijersen Van Buuren ...............
A01F 15/0883
2019/0327901 A1 * 10/2019 Gresset ............... A01F 15/0883

(Continued)

*Primary Examiner* — Thomas Ingram

(74) *Attorney, Agent, or Firm* — Buchanan Ingersoll & Rooney PC

(57) ABSTRACT

An agricultural baler tailgate control system having an actuator operatively connected between the baler frame and tailgate, a pump, and a drive circuit. The drive circuit is reconfigurable between a first configuration in which the drive circuit conveys pressurized fluid by a first fluid path from the pump to the actuator to generate a first actuator drive force to move the tailgate from the closed tailgate position to an intermediate tailgate position, and a second configuration in which the drive circuit conveys the pressurized fluid by a second fluid path from the pump to the actuator to generate a second actuator drive force to move the tailgate from the intermediate tailgate position to a bale release position. The second actuator drive force is different from the first actuator drive force.

12 Claims, 4 Drawing Sheets

(56) References Cited

U.S. PATENT DOCUMENTS

| | | | | |
|---|---|---|---|---|
| 2021/0329843 A1* | 10/2021 | Kraus | .................. | F15B 13/0401 |
| 2022/0015301 A1* | 1/2022 | Derscheid | ............. | A01F 15/106 |
| 2025/0048970 A1* | 2/2025 | Gahres | ................ | A01F 15/0883 |

* cited by examiner

S100 — OPEN LATCH

S102 — BEGIN OPENING TAILGATE WITH FIRST FLOW PATH

S104 — REACH TAILGATE INTERMEDIATE POSITION

S106 — CHANGE TO SECOND FLOW PATH

S108 — CONTINUE OPENING TAILGATE TO BALE EJECT POSTITION

S110 — EJECT BALE

S112 — CLOSE TAILGATE

REGENERATIVE TAILGATE CIRCUIT

CROSS REFERENCE TO RELATED APPLICATION

This application claims priority to U.S. Provisional Patent Application Ser. No. 63/532,719, filed Aug. 15, 2023, the content of such application being incorporated by reference herein in its entirety.

FIELD OF THE INVENTION

The present invention pertains to agricultural balers.

BACKGROUND OF THE INVENTION

Agricultural harvesting machines, such as balers, are used to consolidate and package crop material so as to facilitate the storage and handling of the crop material for later use. In the case of hay or silage, a mower-conditioner is typically used to cut and condition the crop material. In the case of straw, an agricultural combine discharges non-grain crop material from the rear of the combine defining the straw (such as wheat or oat straw) which is to be picked up by the baler. The cut crop material typically is raked into a wind-row, and a baler, such as a large square baler or round baler, straddles the windrows and travels along the windrows to pick up the crop material and form it into bales.

A round baler may generally include a frame, supported by wheels, a hydraulic system, a pickup unit to engage and lift the crop material into the baler, a cutting assembly, a main bale chamber for forming a bale, and a wrapping mechanism for wrapping or tying a material around the bale after it has been formed in the main bale chamber. As the baler is towed over a windrow, the pickup unit lifts the crop material into the baler. Then, the crop material may be cut into smaller pieces by the cutting assembly. As the crop material enters the main bale chamber, multiple carrier elements, e.g. rollers, chains and slats, and/or belts, will begin to roll a bale of hay within the chamber. These carrier elements are movable so that the chamber can initially contract and subsequently expand to maintain an appropriate amount of pressure on the periphery of the bale.

After the bale is formed and wrapped by the wrapping mechanism, the baler's tailgate is opened to eject the bale by allowing the bale to fall out onto the field. The baler usually is stopped in place on the field during bale ejection, in order to help control the bale position and prevent damage to the bale wrapping and potentially the bale itself as it contacts the ground. The total time for the ejection process depends in some part on how long it takes to open the tailgate. A typical agricultural baler uses a hydraulically powered system to open the tailgate when the bale is ready to be ejected. However, such systems can act relatively slowly, particularly in balers having relatively low-powered hydraulic systems, leading to longer ejection process time and therefore reduced harvesting efficiency. Slow tailgate opening also can cause damage to the bale wrapping as the bale continues to contact the carrier elements and tailgate while the tailgate opens.

The problem of slow tailgate opening can be addressed, at least to some degree, by increasing the pressure of the hydraulic circuit. However, this requires a more robust construction to handle operating loads, and potentially leads to significant cost increases for balers having lower-powered hydraulic systems. It is also known to use mechanical systems to operate the tailgate at different speeds, but such systems are expected to add complexity and service requirements.

The inventor has determined that further improvements can be made to agricultural baler machines.

This description of the background is provided to assist with an understanding of the following explanations of exemplary embodiments, and is not an admission that any or all of this background information is necessarily prior art.

SUMMARY OF THE INVENTION

In a first exemplary aspect, there is provided a tailgate control system for an agricultural baler having a frame, a tailgate mounted to the frame and movable relative to the frame through a travel range extending between a closed tailgate position and a bale release position, and a baling chamber defined between the frame and the tailgate. The tailgate control system includes: an actuator operatively connected between the frame and the tailgate; a pump; and a drive circuit configured to convey pressurized fluid from the pump to the actuator. The drive circuit is reconfigurable between: a first configuration in which the drive circuit conveys the pressurized fluid by a first fluid path from the pump to the actuator to generate a first actuator drive force to move the tailgate from the closed tailgate position to an intermediate tailgate position between the closed tailgate position and the bale release position, and a second configuration in which the drive circuit conveys the pressurized fluid by a second fluid path from the pump to the actuator to generate a second actuator drive force to move the tailgate from the intermediate tailgate position to the bale release position, wherein the second actuator drive force is different from the first actuator drive force.

In another exemplary aspect, there is provided a method for operating an actuator configured to move a tailgate of a baler relative to a frame of the baler through a travel path from a closed tailgate position to a bale release position. The method includes: connecting the actuator to a source of pressurized fluid by a first fluid path to generate a first actuator drive force to move the tailgate from the closed tailgate position to an intermediate tailgate position between the closed tailgate position and the bale release position; and connecting the actuator to the source of pressurized fluid by a second fluid path to generate a second actuator drive force to move the tailgate from the intermediate tailgate position to the bale release position.

BRIEF DESCRIPTION OF THE DRAWINGS

Embodiments of inventions will now be described, strictly by way of example, with reference to the accompanying drawings, in which.

In the figures, like reference numerals refer to the same or similar elements.

DETAILED DESCRIPTION OF THE DRAWINGS

Exemplary embodiments are described herein as an agricultural baler including a tailgate opening system and method for opening an agricultural baler tailgate. Embodiments may be used with any type of agricultural baler, including, for example, those that are configured as towed balers and those that are configured as self-driving balers. Embodiments also may be used agricultural balers that prepare round bales, square bales, and so on. The embodiments herein are exemplary and not intended to limit the appended claims.

The terms "forward," "rearward," "left" and "right," when used in connection with the agricultural baler and/or components thereof are usually determined with reference to the direction of forward operative travel of the towing vehicle, but they should not be construed as limiting. The terms "longitudinal" and "transverse" are determined with reference to the fore-and-aft direction of the driving and are equally not to be construed as limiting.

Figure 1:
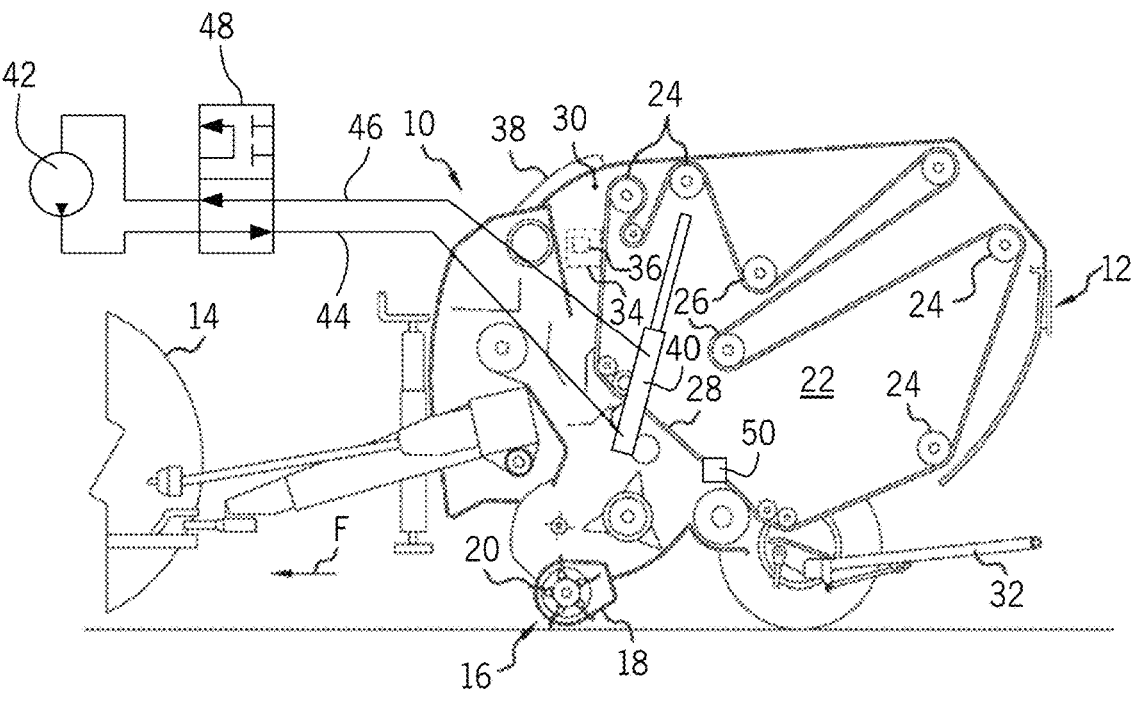
FIG. 1 is a schematic side view of a prior art agricultural baler.

A typical prior art agricultural baler 10 is shown in FIG. 1, in a configuration to be towed in a forward direction F behind a tractor 14 or other vehicle. The baler 10 comprises a main frame 38 that supports the various components of the baler 10, such as roller fixation points, drives, a tailgate 12, a tow arm, a power take-off and internal driveline, ground support wheels, and the like.

Crop material is lifted from windrows into the baler 10 by a pickup unit 16. The pickup unit 16 includes a rotating pickup reel 18 with tine bars and tines 20 that move the crop rearward toward a bale chamber 22. The reel 18 is rotatable in an operating direction for lifting the crop material off of the ground and may also be operable in a reverse direction, i.e., opposite to the operating direction.

The bale chamber 22 is generally defined as a space that is enclosed by the main frame 38 and the tailgate 12. The bale chamber 22 is configured as a variable bale chamber 22 having stationary rollers 24, movable rollers 26, and at least one belt 28 that wraps around the rollers 24, 26. The rollers 24, 26 may comprise a floor roller, starter roller, fixed roller(s), pivot roller(s), stripper roller, follower roller(s) and so on. The movable rollers 26 are mounted on movable supports, typically pivotable arms, and one or more tensioners in the form of mechanical springs or other resilient biasing mechanisms (e.g., a pneumatic accumulator connected to a hydraulic cylinder) are provided to bias the movable rollers 26 to a starting position when there is no bale in the bale chamber 22, such as shown in FIG. 1. As the bale grows, the portion of the belt 28 wrapped around the bale increases in length. In order to allow this to happen, the movable rollers 26 are pulled back against the tensioners. One or more actuators may be provided to positively control the positions of the arm(s) and thus the movable rollers 26.

Together, the rollers 24, 26 and the belt(s) 28 create a circulating chamber 22 that engages and rolls the crop material into a bale. When the bale reaches a predetermined size, the bale is wrapped with a wrapping material (e.g., mesh, twine or sheet) by a wrapper. Once fully wrapped, the bale is ejected from the baler 10. The bale is ejected by unlocking a latch 50 that holds the tailgate 12 in a closed position, and using one or more actuators 40 to pivot the tailgate 12 about the tailgate pivot 30 to open the bale chamber 22. As the tailgate 12 opens, the bale rolls out of the bale chamber 22 and onto a bale ejector or kicker 32, which pushes the bale rearwardly away from the baler 10 so that the tailgate 12 may be closed without encountering the ejected bale.

The actuator(s) 40 may be powered by a hydraulic pump 42, which may be located in the baler 10, but more typically the pump 42 in the vehicle 14. The pump 42 is powered by an engine (e.g., a diesel engine), and is connected to the actuator or actuators by a supply line 44 and a return line 46. A valve 48 is provided to control when the hydraulic fluid is pumped to the cylinder to extend the actuator 40, or the pump 42 may be selectively operated by engaging a clutch or the like. The valve 48 (or a pump clutch) may be controlled manually by the operator or automatically by a control system.

The baler 10 can further include an electrical processing circuit 34 (e.g., a controller 34 with a memory 36), for conducting various baling procedures. For instance, the controller 34 can be configured for carrying out the bale discharge operation. Hence, the controller 34 may open the tailgate 12 via accompanying actuators upon sensing a full bale condition by a bale-size sensor integrated into or connected to the processing circuit 34.

The operating steps described herein may be performed by the controller 64 upon loading and executing software code or instructions which are tangibly stored on a tangible computer readable medium, such as on a magnetic medium (e.g., a computer hard drive), an optical medium (e.g., an optical disc), solid-state memory (e.g., flash memory), or other storage media known in the art. Thus, any of the methods described herein can be implemented in software code or instructions which are tangibly stored on the tangible computer readable medium.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

It has been found that conventional balers 10 can experience operational delays when opening the tailgate 12. In particular, it has been found that after the tailgate latch 50 is released, the bale can apply an opening load that tends to push the tailgate 12 open. This generates a tension load on the actuator 40, and the pump 42 may be incapable of supplying hydraulic fluid to the cylinder side of the actuator fast enough to accommodate the opening load generated by the bale (i.e., the pump 42 and/or motor by which it is driven resists overrunning and thus resists the opening load). Thus, even though the bale applies an opening load to push the tailgate 12 open, the slow supply of hydraulic fluid inhibits the opening speed of the tailgate 12. After some time, the opening load generated by the bale varies based on the geometry of the interaction between the bale and the tailgate, and the amount of force required to continue opening the tailgate 12 can increase as the actuator 40 loses mechanical advantage in the connection between the frame 38 and the tailgate 12. At a transition point, as the opening load generated by the bale decreases and the actuator 40 must make up for the decreasing (and eventually absent) opening load generated by the bale, to operate to continue opening the tailgate 12. When this happens, it has been found that the pump 42 can struggle to increase pressure in the actuator 40 to generate the load necessary to continue opening the tailgate 12. This is especially problematic with lower-powered hydraulic systems. This leads to slow operation and delays. Also, prolonged contact between the tailgate 12 and the bale has greater potential to damage the bale wrapping.

Figure 4:
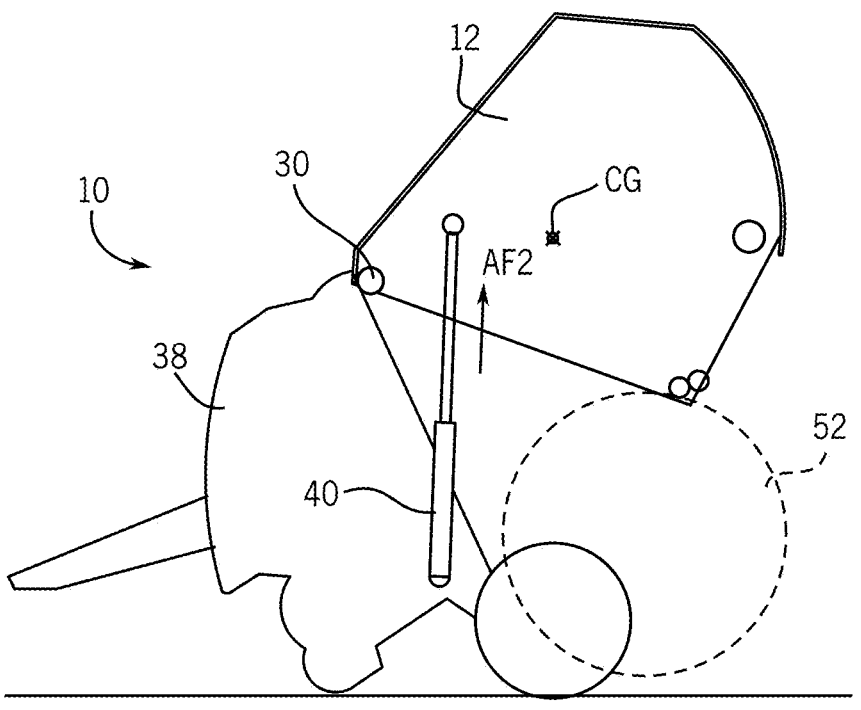
FIG. 4 schematically illustrates the agricultural baler of FIG. 2, shown with the tailgate in a bale release position.
Figure 5:
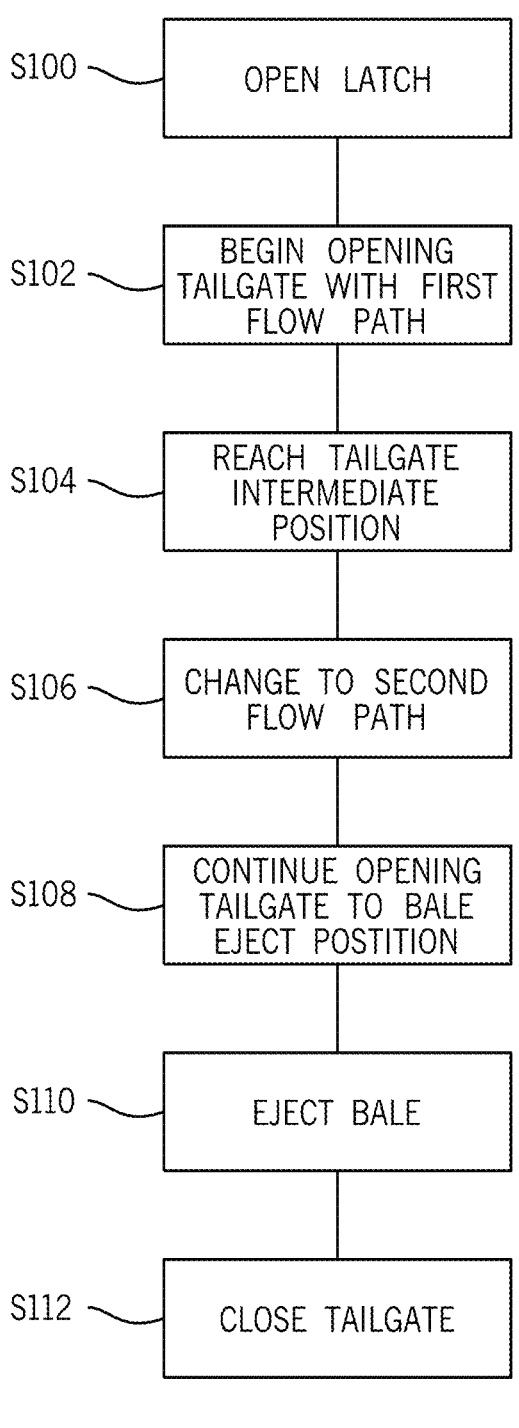
FIG. 5 is a flowchart illustrating a method for operating a baler tailgate.

It has been found that this problem can be addressed, or at least mitigated, by operating the actuator 40 in a hydraulically staged manner in which the actuator 40 is driven with a drive circuit configured with a first fluid path during a first portion of the opening process, and configured with a second fluid path during a second portion of the opening process. During the first portion, the drive force generated by the actuator 40 is relatively low, and at the same time allows relatively fast extension of the actuator 40 as the bale generates an opening force against the tailgate. In the second portion, the drive force is relatively high, and provides relatively slow extension of the actuator 40. Exemplary embodiments of such a system are illustrated in FIGS. 2-4, which show a baler 10 operating to eject a bale 52, FIG. 5, which shows an exemplary method for performing the bale ejection process shown in FIGS. 2-4, and FIGS. 6-7, which show details of a hydraulic system for operating the bale tailgate 12 to effectuate the bale ejection procedure.

Figure 2:
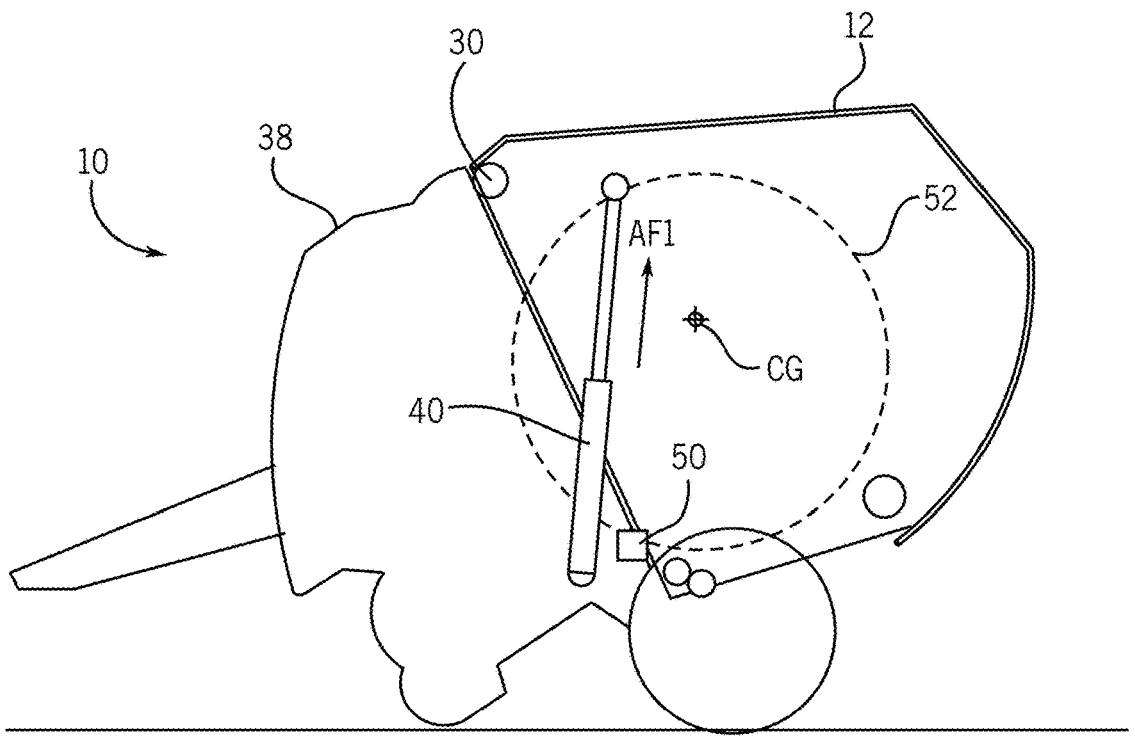
FIG. 2 schematically illustrates an agricultural baler according to an exemplary embodiment of the invention, shown with the tailgate in the closed position.

FIG. 2 shows a baler 10 at the beginning of the ejection process, with the tailgate 12 fully closed and a bale 52 formed in the bale chamber 22. The bale 52 has reached a final size, been wrapped, and is ready to be ejected. The baler 10 also may be nearly or fully stopped along the forward direction F. At this point, the tailgate latch 50 is opened (step S100), and the actuator 40 is operated with the drive circuit configured with a first fluid path directing pressurized fluid to the actuator 40 in order to generate a first actuator force AF1 to begin opening the tailgate (step S102).

As can be seen from FIG. 2, the bale 52 rests generally above the lower end of the tailgate 12 at the beginning of the ejection process. At this time, the tension generated on the belt 28 by the movable rollers 26 (i.e., by the fact that the movable rollers 26 have been pushed back against their tensioner to allow the belt to wrap around the bale), creates a force that tends to open the tailgate 12. This force is resisted by the closed latch 50. At the same time, the center of gravity CG of the tailgate 12 is located below the pivot 30, and therefore the force required to push the tailgate open 12 is relatively low (i.e., because a significant component of the movement of the center of gravity CG along the circular path defined by the pivot 30 is in the horizontal direction). Because of this, a relatively low amount of force is required of the actuator 40 to begin pushing the tailgate 12 open during this initial stage. For example, in some cases, this force may be less than about 1000 lbf, but the actual value varies depending on the particular geometry and dimensions of the various parts.

Figure 3:
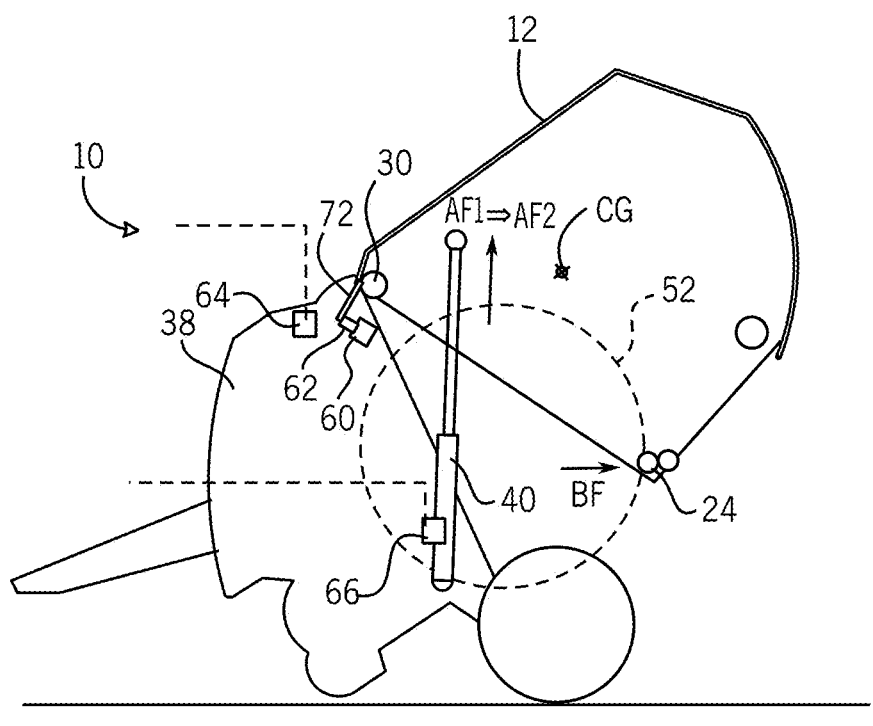
FIG. 3 schematically illustrates the agricultural baler of FIG. 2, shown with the tailgate in an intermediate opened position.

FIG. 3 shows the baler 10 partially through the ejection process. In this state, the tailgate 12 is partially opened to an intermediate position. Here, the bale 52 is positioned between the frame 38 and the tailgate 12, and the bale 52 is moving out of the bale chamber 22. The bale 52 contacts the tailgate (e.g., via the belt 28 at the lowermost stationary roll 24) and the tension applied by the belt 28 and the weight of the bale 52 generate a bale force BF that pushes the tailgate 12 in the opening direction.

Figure 6:
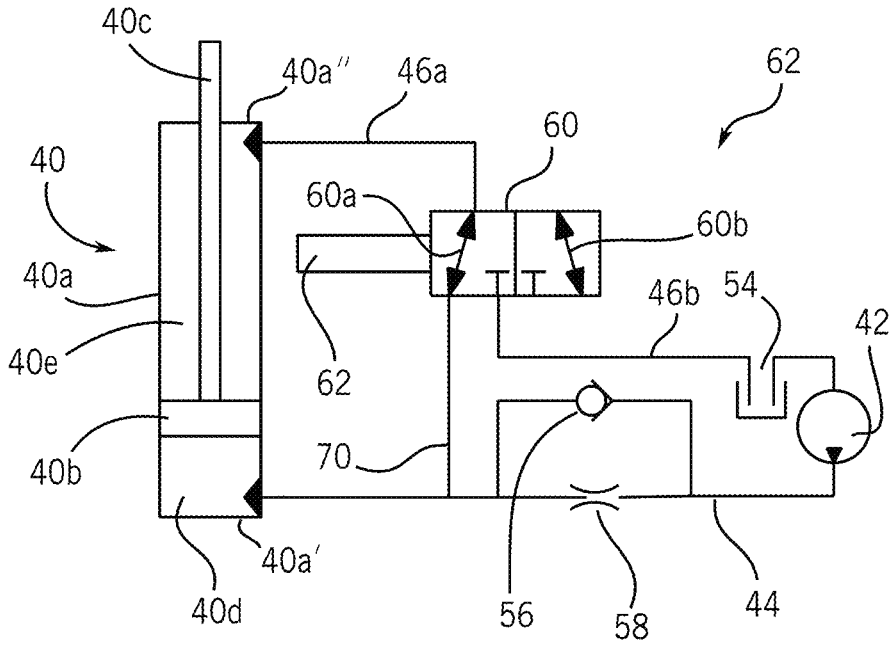
FIGS. 6 and 7 schematically illustrate an exemplary baler tailgate system, shown in two different operating conditions.
Figure 7:
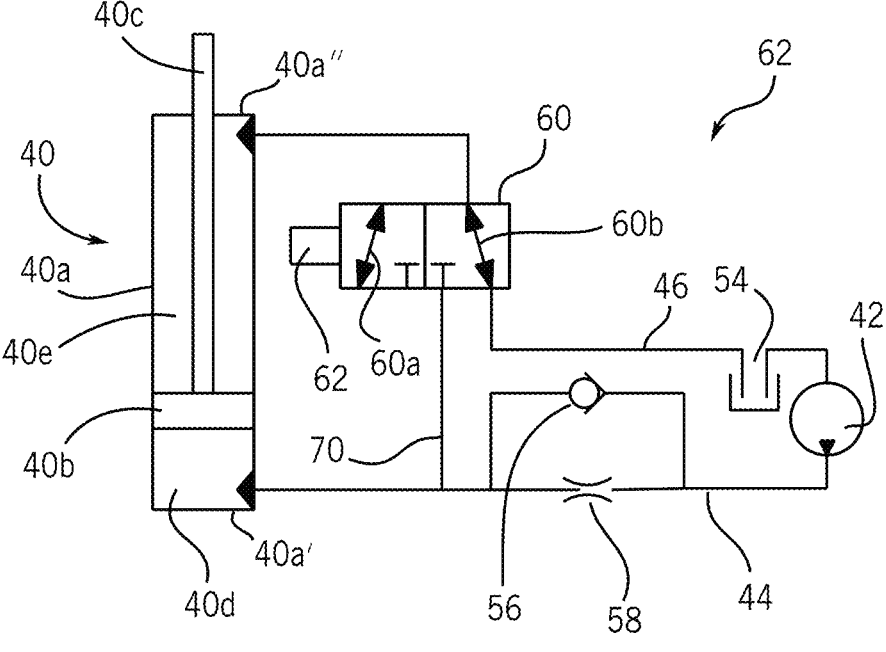

The magnitude of the bale force BF depends on various factors, such as the tension present in the belt 28, the angles at which the bale 52 contacts the frame 38 and the tailgate 12, the bale's weight and geometry, and drive forces that might be generated by the bale's momentum and forces applied via a moving belt 28. During this time, the actuator 40 is connected via the first fluid path (e.g., a regenerative fluid path, such as described below), which allows the actuator 40 to rapidly open in response to the bale force BF, particularly when the bale force BF equals or exceeds the first actuator drive force A1. FIGS. 6-7 show an exemplary drive circuit that can be configured in a first fluid path that provides this function.

Upon reaching the intermediate tailgate position (step S104), such as schematically shown in FIG. 3, the drive circuit is reconfigured to a second fluid path directing pressurized fluid to the actuator 40 (step S106), to thereby to generate a second actuator force AF2 to continue moving the tailgate 12 from the intermediate position to a bale eject position as shown schematically in FIG. 4 (step S108). As used herein, the "bale eject position" is the position at which the bale can fully eject from the baler 10 (e.g., when the tailgate 12 is high enough to clear the bale 52 as the baler 10 moves forward), and this position may vary depending on the operating conditions and desired bale size.

The intermediate tailgate position can be established using various criteria. For example, a position sensor 62 may be provided on the baler 10 to determine an angular position of the tailgate 12 relative to the frame 38, or a pressure sensor 64 may be used to determine when the pressure of the hydraulic fluid in the actuator 40 (e.g., by measuring it directly in the actuator 40 or indirectly by measuring pressure in the supply line 44) has reached a certain value or has changed values in a particular manner (e.g., experiencing a rapid change in magnitude). As another example, a position sensor may be used to detect when the bale 52 has reached a certain point along the ejection travel path. As still another example, a timer may be used to determine how long the actuator 40 has been driven via the first fluid path. As another example, the tension in the belt 28 may be evaluated to determine when to transition to the second fluid path (e.g., when the tension drops indicating that the bale force BF is decreasing). Similarly, a position sensor may be configured to determine a state of extension of the movable rollers 26. Other alternatives and embodiments will be apparent to persons of ordinary skill in the art in view of the present disclosure.

As can be seen from FIGS. 3 and 4, the center of gravity CG of the tailgate 12 moves vertically to be more level with the pivot 30 as the tailgate 12 opens. Thus, the amount of force necessary to continue moving the tailgate 12 about the pivot 30 increases (i.e., because all or nearly all of the movement of the center of gravity CG along the circular path defined by the pivot 30 is in the vertical direction). In addition, the belt 28 and bale 52 may not generate any significant bale force BF to push the tailgate 12 open. Thus, the second actuator force AF2 should be greater in magnitude than the first actuator force AF1 to continue moving the tailgate 12 to the bale eject position. However, it will be understood that other factors, such as the geometric arrangement of the actuator 40 with respect to the frame 38 and tailgate 12 and the location of the tailgate's center of gravity CG can effect the relationship between the first actuator force AF1 and the second actuator force AF2.

After the tailgate 12 reaches the bale eject position, the bale 52 is fully ejected from the baler 10 (step S110), the tailgate 12 is closed (step S112), and the baling process begins again.

FIGS. 6 and 7 schematically illustrate an example of a drive circuit 68 suitable for performing the process described above. The drive circuit 68 operatively connects the pump 42 to the actuator 40, and generally includes a supply line 44 to convey pressurized fluid from the pump 42 to the actuator 40, and a return line 46 to convey fluid from the actuator 40 to the pump 40 (directly or by way of a reservoir 54 or the like). The supply line 44 may include, for example, a check valve to prevent unregulated reverse flow away from the actuator 40 when the pump 42 is deactivated, and an orifice 58 or other restriction to allow fluid to bleed out at a controlled rate when the pump 42 is deactivated. The return line 46 may include features such as a reservoir 54 or drain to collect hydraulic fluid, and so on. One or more shutoff valves (not shown) or couplings (not shown) may be provided in the supply line 44 and return line 46. For example, the pump 42 may be located in a vehicle 14 to which the baler 10 is attached as a trailer, and the supply line 44 and return line 46 may have valves and/or dry-break couplings to selectively make a hydraulic connection to the pump 42 to power the actuator 40. Other alternatives and embodiments will be apparent to persons of ordinary skill in the art in view of the present disclosure.

The drive circuit 68 also includes a reconfigurable hydraulic fluid path in the form of, for example, one or more fluid path valves 60. In this case, a single fluid path valve 60 is provided, but additional valves may be used. Details of the exemplary valve 60 are discussed below.

The pump 42 may comprise any suitable hydraulic pump, as are known in the art. Similarly, the actuator 40 may comprise a conventional telescoping piston and cylinder actuator, such as shown, or a rotary actuator or the like. The actuator 40 may be directly connected at one end to the frame 38, and at the other end to the tailgate 12, such as shown in FIGS. 2-4. Alternatively the actuator 40 may be connected between the frame 38 and tailgate 12 by one more additional links to form a levered or linkage arrangement. Other alternatives and embodiments will be apparent to persons of ordinary skill in the art in view of the present disclosure.

The actuator 40 generally includes a cylinder 40*a* that extends from a proximal cylinder end 40*a'* to a distal cylinder end 40*a"*, and a piston 40*b* that is slidable within the cylinder 40*a* and has seals to hydraulically divide the cylinder 40*a* into a base chamber 40*d* and a rod chamber 40*e*. A rod 40*c* is secured to the piston 40*b* and extends from the piston 40*b*, through the rod chamber 40*e*, and out past the distal cylinder end 40*a"*. The base chamber 40*d* and rod chamber 40*e* each has one or more hydraulic ports that are fluidly connected to the drive circuit 68.

The exemplary fluid path valve 60 comprises a two-position valve spool 60*a* having a first valve passage 60*b* and a second valve passage 60*c*. A valve controller 62, such as a mechanical lever, electrical solenoid, or hydraulic actuator or flow supply, is provided to selectively move the valve spool 60*a*. The valve controller 62 also may include a return spring (not shown) if the valve controller 62 uses a single-acting actuator to move the valve circuit FIG. 6.

The fluid path valve 60 is fluidly connected between a first portion 46*a* of the return line 46 extending from the rod chamber 40*e*, and a second portion 46*b* of the return line 46 extending to the pump 42. The fluid path valve 60 is also fluidly connected to a bypass line 70 that is fluidly connected to the supply line 44.

FIG. 6 shows the valve spool 60*a* in a first position, which corresponds to the first fluid path described above. In this position, the first valve passage 60*b* fluidly connects the first portion 46*a* of the return line 46 to the bypass line 70, and disconnects the second portion 46*b* of the return line 46 from the actuator 40. In this configuration, pressurized fluid from the outlet of the pump 42 is conveyed simultaneously to the base chamber 40*d* and the rod chamber 40*e*. The surface area of the piston 40*b* in the base chamber 40*d* is greater than the surface area of the piston 40*b* in the rod chamber 40*e* because the rod 40*c* occupies some portion of the piston's face. Thus, although the respective local pressures in the base chamber 40*d* and rod chamber 40*e* are the same, greater force is generated on the side facing the base chamber 40*d*. In this configuration, a relatively low first amount of actuator force AF1 is generated to extend the piston 40*b* and rod 40*c*, to thereby open the tailgate 12. At the same time, the configuration shown in FIG. 6 allows fluid to flow with relative ease from the rod chamber 40*e* to the base chamber 40*d*. Thus, the actuator 40 will provide relatively little resistance to a force generating tension on the actuator 40, such as a bale force BF as described above. Thus, the configuration in FIG. 6 generates a smaller force, but allows the tailgate 12 to open faster as the bale 52 presses on it.

FIG. 7 shows the valve spool 60*a* in a second position, which corresponds to the second fluid path described above. In this position, the second valve passage 60*c* fluidly connects the first portion 46*a* of the return line 46 to the second portion 46*b* of the return line 46, and seals the end of the bypass line 70. Pressurized fluid from the outlet of the pump 42 is conveyed only to the base chamber 40*d*, and the rod chamber 40*e* is fluidly connected to a fluid return, such as the suction side of the pump 43 or the reservoir 54. The hydraulic pump 42 and/or the motor that drives the pump 42 tends, to resist overrunning beyond its designated operating speed, and therefore a tension load on the actuator 40, such as a bale force BF, will be resisted by the pump 42. However, the force generated on the piston 40*b* is maximized because there is relatively little or no backpressure on the rod chamber face of the piston 40*b*. Thus, a relatively high second amount of actuator force AF2 is generated to extend the piston 40*b* and rod 40*c*, to thereby open the tailgate 12.

The fluid path valve 60 may be operated automatically by the processing circuit 34 using feedback from one or more sensors (e.g., position sensor 64, pressure sensor 66, etc.), or by other control algorithms (e.g., a timer, etc.). The fluid path valve 60 also may be operated by a mechanical or hydraulic linkage to one or more other operating parts. For example, as shown in FIG. 3, the tailgate 12 may have a lever 72 that presses on the fluid path valve spool directly or via a remote valve controller (e.g., a hydraulic actuator that drives the valve spool against a return spring). The fluid path valve 60 also may be operable by the machine operator, such as by operating an electric circuit or throwing a mechanical lever to control the valve controller 62. Other alternatives and embodiments will be apparent to persons of ordinary skill in the art in view of the present disclosure.

From the foregoing, it will be seen that the tailgate drive circuit 68 can be operated to open the tailgate 12 relatively quickly during the initial opening stage, because the bale force BF can be effectively used to help open the tailgate 12 with little resistance form the actuator 40. Then, when the bale force BF become less useful and the force required to open the tailgate 12 increases, the tailgate drive circuit 68 transitions to a higher power, lower speed configuration to finish the bale ejection process. Thus the total bale ejection time can be reduced, and damage to the bale 52 can be better avoided by minimizing contact time with the tailgate 12.

The present disclosure describes a number of inventive features and/or combinations of features that may be used alone or in combination with each other or in combination with other technologies. The embodiments described herein are all exemplary, and are not intended to limit the scope of the claims. It will be appreciated that various aspects of the embodiments described herein may be provided as component parts or as subassemblies. It will also be appreciated that the inventions described herein can be modified and adapted in various ways, and all such modifications and adaptations are intended to be included in the scope of this disclosure and the appended claims.

It will also be understood that the description herein and the claims describe features that may be combined with other features not specifically described. For example, a counterknife as described and claimed herein may be used in conjunction with other, conventional counterknives, and so on. Also, features identified in the singular or by a specific number are not intended to be limited to a single features or the described number of features unless specifically recited as being present only in the specified quantity. For example, a recitation of "a" feature shall be interpreted as "one or more" features unless specifically narrowed by additional language.

The invention claimed is:

1. A tailgate control system for an agricultural baler having a frame, a tailgate mounted to the frame and movable relative to the frame through a travel range extending between a closed tailgate position and a bale release position, and a baling chamber defined between the frame and the tailgate, the tailgate control system comprising:

an actuator operatively connected between the frame and the tailgate;

a pump; and a drive circuit configured to convey pressurized fluid from the pump to the actuator, wherein the drive circuit is reconfigurable between a first configuration in which the drive circuit conveys the pressurized fluid by a first fluid path from the pump to the actuator to generate a first actuator drive force to move the tailgate from the closed tailgate position to an intermediate tailgate position between the closed tailgate position and the bale release position, and a second configuration in which the drive circuit conveys the pressurized fluid by a second fluid path from the pump to the actuator to generate a second actuator drive force to move the tailgate from the intermediate tailgate position to the bale release position, wherein the second actuator drive force is different from the first actuator drive force, wherein the drive circuit comprises a fluid path valve that is movable in a first direction to move the drive circuit from the first configuration to the second configuration, and in a second direction to move the drive circuit from the second configuration to the first configuration, wherein the actuator includes a cylinder having a proximal cylinder end and a distal cylinder end, a piston telescopically movable within the cylinder and hydraulically dividing the cylinder into a base chamber and a rod chamber, and a rod having a proximal rod end secured to the piston and a distal end extending through the rod chamber and through the distal cylinder end, and wherein the fluid path valve is configured to in the first configuration, fluidly connect the pressurized fluid from an outlet of the pump to the base chamber and the rod chamber, and in the second configuration, fluidly connect the pressurized fluid from the outlet of the pump to the base chamber, and fluidly connect the rod chamber to a fluid return.

2. The tailgate control system of claim 1, wherein the second actuator drive force is greater than the first actuator drive force.

3. The tailgate control system of claim 1, further comprising at least one valve controller configured to remotely move the fluid path valve in at least one of the first direction and the second direction.

4. The tailgate control system of claim 3, further comprising a control unit operatively connected to the actuator and configured to control the actuator based on a feedback signal.

5. The tailgate control system of claim 4, wherein the feedback signal comprises a signal from a position sensor indicating a position of the tailgate along the travel range.

6. The tailgate control system of claim 4, wherein the feedback signal comprises a signal from a pressure sensor indicating a pressure in the actuator.

7. A method for operating an actuator configured to move a tailgate of a baler relative to a frame of the baler through a travel path from a closed tailgate position to a bale release position, the method comprising:

connecting the actuator to a source of pressurized fluid by a first fluid path to generate a first actuator drive force to move the tailgate from the closed tailgate position to an intermediate tailgate position between the closed tailgate position and the bale release position; and connecting the actuator to the source of pressurized fluid by a second fluid path to generate a second actuator drive force to move the tailgate from the intermediate tailgate position to the bale release position, wherein the first fluid path comprises a regenerative fluid path in which a base chamber and a rod chamber of the actuator are fluidly connected to the source of pressurized fluid, and the second fluid path comprises a single-side fluid path in which only the base chamber is connected to the source of pressurized fluid.

8. The method of claim 7, wherein the second actuator drive force is greater than the first actuator drive force.

9. The method of claim 7, wherein the first fluid path and the second fluid path are defined in a single movable valve.

10. The method of claim 7, further comprising:

receiving a sensor signal indicating that the tailgate is in the intermediate tailgate position; and operating a valve to change the first fluid path to the second fluid path.

11. The method of claim 10, wherein the sensor signal comprises:

an angular position sensor signal indicating an angular position of the tailgate relative to the frame; or a pressure sensor signal indicating a pressure of hydraulic fluid in the first fluid path.

12. The method of claim 7, further comprising applying a bale drive force to bias the tailgate from the closed tailgate position towards the bale release position, during at least a portion of time in which the actuator is connected to the source of pressurized fluid by the first fluid path.

* * * * *